United States Patent [19]
Kanbe

[11] Patent Number: 5,649,453
[45] Date of Patent: Jul. 22, 1997

[54] PARKING BRAKE MECHANISM FOR VEHICLES

[75] Inventor: Kazunari Kanbe, Kariya, Japan

[73] Assignee: Aisin Seiki Kabushiki Kaisha, Kariya, Japan

[21] Appl. No.: 575,550

[22] Filed: Dec. 20, 1995

[30] Foreign Application Priority Data

Dec. 20, 1994 [JP] Japan .................................. 6-316418

[51] Int. Cl.$^6$ ................................................ G05G 1/14
[52] U.S. Cl. .................... 74/512; 74/516; 74/540; 74/542; 74/560; 74/575; 74/577 M
[58] Field of Search ..................... 74/512, 516, 575, 74/501.5 R, 542, 567, 569, 518, 560, 540

[56] References Cited

U.S. PATENT DOCUMENTS

| | | | |
|---|---|---|---|
| 3,897,694 | 8/1975 | Hirst | 74/516 |
| 4,421,214 | 12/1983 | Sellmeyer | 74/529 |
| 4,612,823 | 9/1986 | DeLeeuw et al. | |
| 4,841,798 | 6/1989 | Porter et al. | |
| 4,919,242 | 4/1990 | Muramatsu et al. | 192/4 A |
| 5,086,663 | 2/1992 | Asano et al. | 74/512 |
| 5,131,288 | 7/1992 | Barlas | 74/512 |
| 5,235,867 | 8/1993 | Wortmann et al. | 74/501.5 R |
| 5,448,928 | 9/1995 | Harger | 74/523 |
| 5,460,061 | 10/1995 | Redding et al. | 74/512 |
| 5,477,746 | 12/1995 | Perisho et al. | 74/512 |

FOREIGN PATENT DOCUMENTS

| | | | |
|---|---|---|---|
| 2208543 | 9/1973 | Germany | 74/512 |
| 2-249747 | 10/1990 | Japan . | |
| 2041471 | 9/1980 | United Kingdom | 74/512 |

Primary Examiner—Vinh T. Luong
Attorney, Agent, or Firm—Burns, Doane, Swecker & Mathis, LLP

[57] ABSTRACT

A parking brake mechanism for vehicles includes a cam plate free to rotate about main shaft with respect to a foot operated parking brake pedal lever and having cam portions. When a brake control cable is connected with the wheel brake assembly, the cam plate is held in integral relation with the brake pedal lever by one of the cam portions, a cam follower and a tension spring so that the cable cam be easily connected with the cam plate regardless of the biasing force of the tension spring.

4 Claims, 4 Drawing Sheets

WHEEL BRAKE ASSEMBLY

PARKING BRAKE MECHANISM FOR VEHICLES

BACKGROUND OF THE INVENTION

The present invention relates to a parking brake mechanism for vehicles, more particularly to a parking brake mechanism including a cam plate free to rotate with respect to a foot-operated parking brake pedal lever and adapted to be connected with a brake control cable.

Conventionally, a vehicle is provided with a parking brake mechanism including a foot-operated parking brake pedal lever for tensioning a brake control cable connected therewith and setting the parking brake. The brake pedal lever is displaced from a retracted position where the parking brake is released to a depressed or brake-engaged position where the parking brake is set. This type of the parking brake mechanism is described, for example, in the disclosures of Japanese Laid-Open (KOKAI) Specification No. 249747/1990, U.S. Pat. No. 4,612,823 or U.S. Pat. No. 4,841,798.

The conventional parking brake mechanism also has the cable which is connected with the brake pedal lever and a wheel brake assembly and wound around a drum portion formed on the brake pedal lever through a cable tension self-adjusting spring. This spring is useful in automatically compensating for lack of cable tension or taking up cable slack due to wear to maintain uniform cable tension. However, when the cable connected with the brake pedal lever through the cable tension self-adjusting spring is to be connected with the wheel brake assembly, the large amount of external force adequate to pull the cable toward the wheel brake assembly by overcoming the biasing force of the cable tension self-adjusting spring is always necessary. This is inconvenient for the works of cable connection. Consequently, it is eagerly desired not to necessitate such the large external force when the cable is connected with the wheel brake assembly.

SUMMARY OF THE INVENTION

Therefore, an object of the present invention is to provide a parking brake mechanism for vehicles which can easily connect a brake control cable with a wheel brake assembly.

To achieve the foregoing object of the present invention, there is provided a parking brake mechanism for a vehicle comprising: a bracket adapted for connection with a body of the vehicle, a foot-operated brake pedal lever rotatably supported on a main shaft secured to the bracket and displaced between a retracted position and a brake-engaged position, a cam plate pivoted on the main pin in a manner to be free to rotate with respect to the brake pedal lever and having a first cam portion and a second cam portion, a cable connected at its one end with the cam plate and at the other end with a wheel brake assembly to be pulled by a foot depression of the brake pedal lever, a cam follower engaged in a cam slot formed on the brake pedal lever for displacement along the cam slot, and a spring disposed between the vehicle body and the cam follower to urge the cam follower toward the cam portions in pressure contact therewith, the cam plate and the brake pedal lever being integrally displaced when the cam follower is springly engaged with the first cam portion, and the cam plate being displaced about the main shaft with respect to the brake pedal lever by the biasing force of the spring in the direction to pull the cable when the cam follower is springly engaged with the second cam portion.

BRIEF DESCRIPTION OF THE DRAWINGS

The foregoing objects and other objects as well as the features of the present invention will become more apparent from the following description of a preferred embodiment in which the present invention is applied to a parking brake mechanism for vehicles as shown in the accompanying drawings.

DESCRIPTION OF THE PREFERRED EMBODIMENT

Figure 1:
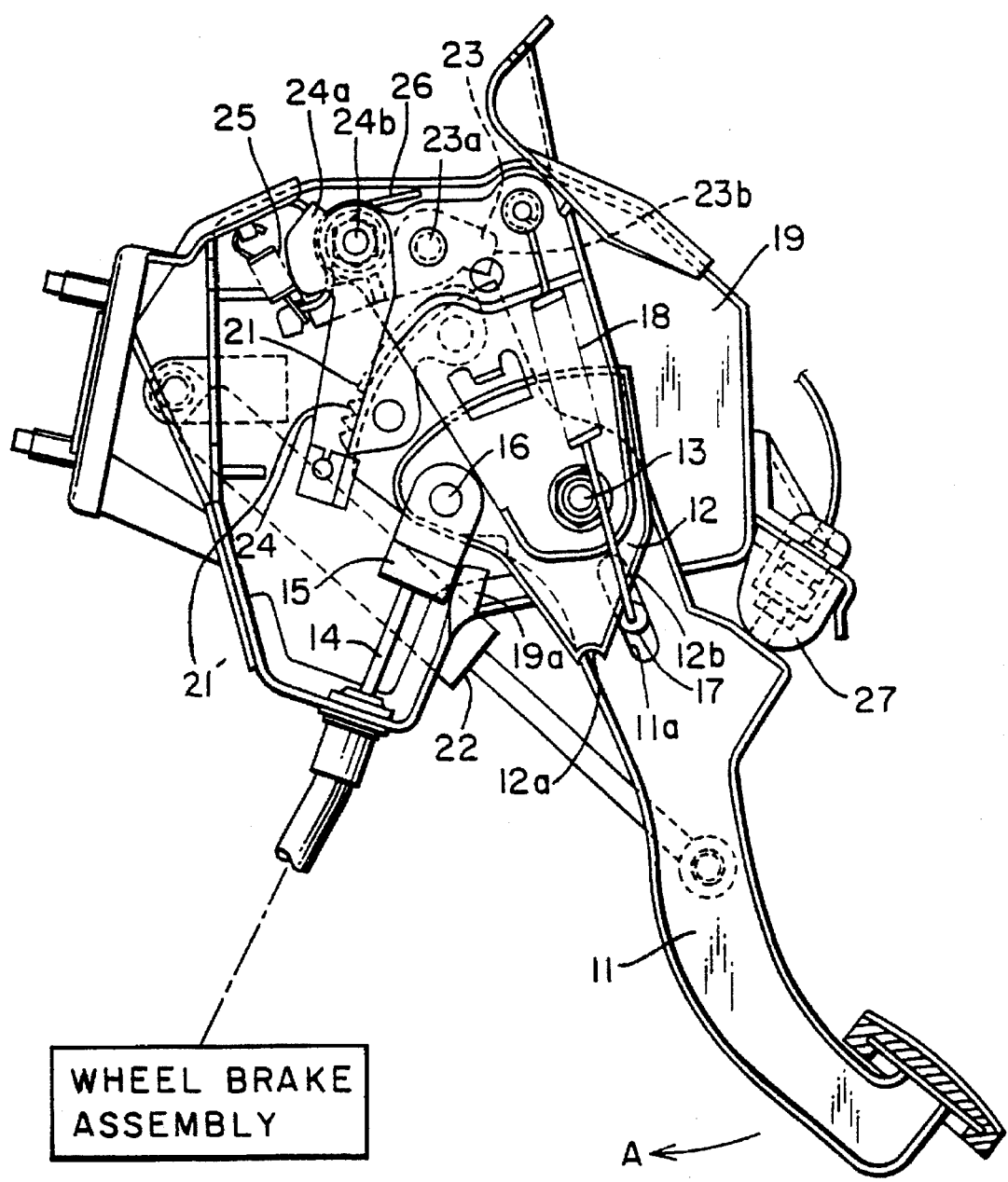
FIG. 1 is a side view of a parking brake mechanism according to the present invention.

Referring to the drawings, particularly to FIG. 1, there is shown a parking brake mechanism to which the present invention is applicable including a foot operated parking brake pedal lever 11 which pivots on a main shaft 13 secured to a bracket 19 which is adapted to be mounted to a vehicle's body. When the brake pedal lever 11 is depressed by a foot in the direction of an arrow A, the brake pedal lever 11 is displaced from a retracted position where it is abutted on a rubber stopper 27 to a brake engaged position where it is abutted on a stopper 19a. A cam plate 12 also pivots on the main shaft 13 in a manner to be free to rotate with respect to the brake pedal lever 11. The cam plate 12 is provided at one side edge with a first cam portion 12a which is composed of a semi-circular recess and a second cam portion 12b which is composed of a tapered surface. The semi-circular recess 12a is continuously formed along a side edge of the tapered surface 12b.

A brake control cable 14 is connected with the cam plate 12 by means of a connector 15 and a pin 16, which cable cooperates with a wheel brake assembly.

The brake pedal lever 11 is formed with a cam slot 11a which is engaged with a cam follower 17. There is provided a tension spring 18 for maintaining the cam follower 17 normally in pressure contact with the cam portion 12a or 12b. The brake pedal lever 11 is provided with a ratchet plate 21 having a number of teeth 21' which are integrally formed therewith. A pawl plate 23 having a nose 23b at its end pivots on a pin 23a and is normally urged clockwise (in FIG. 1) by a spring 25. There is provided a release lever 24 which pivots on a pin 24b and has a tab 24a abutting on a part of the pawl plate 23. A return spring 26 exerts the biasing force against the release lever 24 so as to keep the latter in a position as shown in FIG. 1 (namely, where the nose 23b of the pawl plate 23 does not face the teeth 21' of the ratchet plate 21). The release lever 24 is manually operated by a manually actuable operating rod (not shown).

Figure 2:
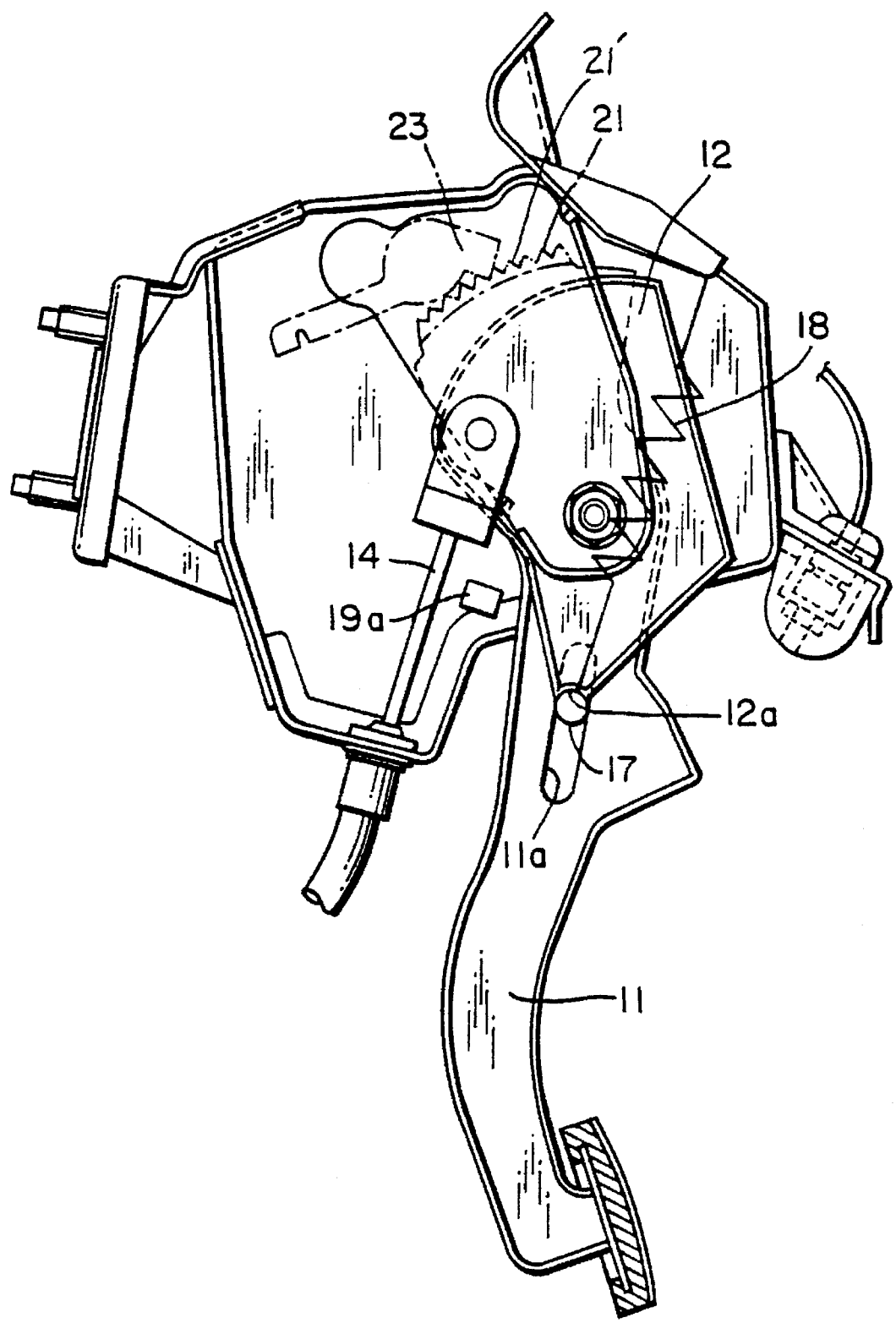
FIG. 2 is a somewhat schematic side view illustrating main parts of the parking brake mechanism when a cable is to be connected with a wheel brake assembly according to the illustrated embodiment.
Figure 3:
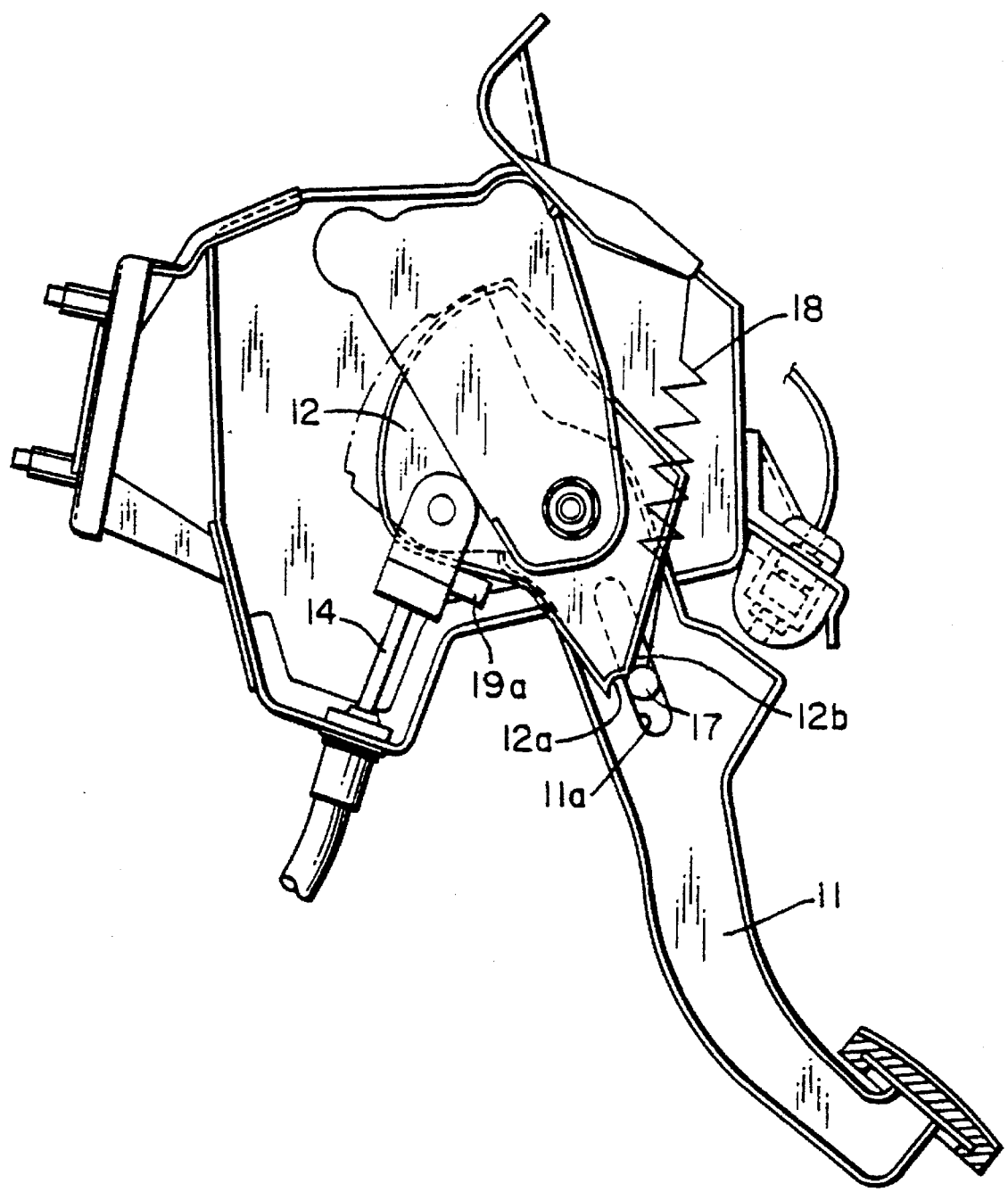
FIG. 3 is a somewhat schematic side view illustrating the main parts of the parking brake mechanism just after the cable has been connected with the wheel brake assembly.
Figure 4:
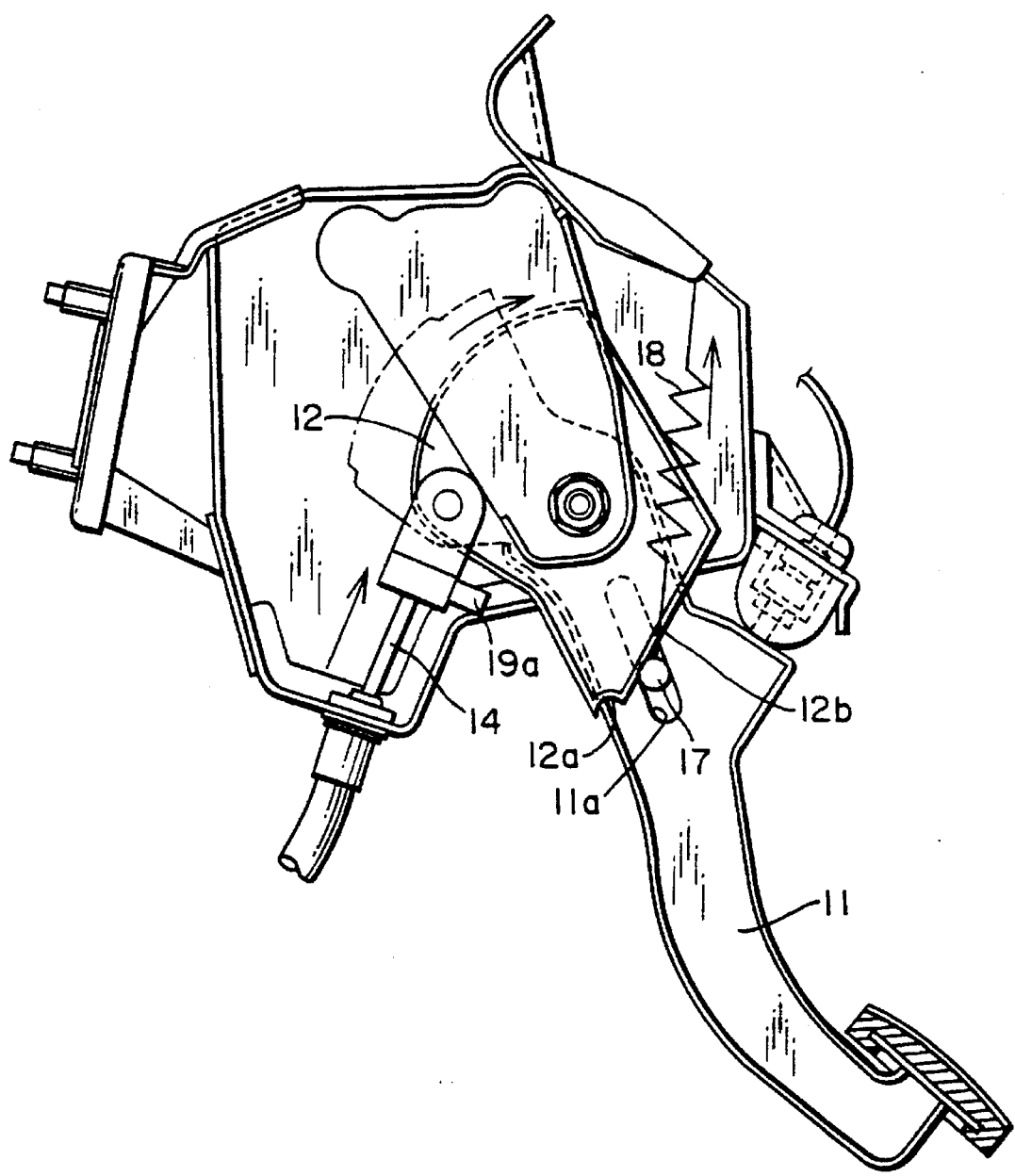
FIG. 4 is a somewhat schematic side view illustrating the main parts of the parking brake mechanism when a tension of the cable is automatically adjusted.

In the embodiment of the present invention, the brake pedal lever 11 and the cam follower 12 are integrally connected not to make a relative movement between both the members 11, 12 in the case that the cam follower 17 is springly engaged with the first cam portion 12a and the pawl plate 23 is engaged with the teeth of the ratchet plate 21. Consequently, the cable 14 is connected with the cam plate 12 under this condition as shown in FIG. 2 and the other end of the cable 14 can be easily connected with the wheel brake assembly regardless of the biasing force of the tension spring 18, so that associated with connecting the cable 14 with the cam plate 12 and the wheel brake assembly becomes easier. After that, the cam follower 17 is released from the first cam portion 12a and forced to be springly engaged with the second cam portion 12b by releasing the pawl plate 23 from the teeth 21' of the ratchet 21 and moving compulsorily the brake pedal lever 11 with respect to the cam plate 12 under the condition that the cam plate 12 is abutted on the stopper 19a (see FIG. 3).

The tension spring 18 exerts the biasing force against the cam plate 12 through the cam follower 17 tending to pivot the cam plate 12 clockwise about the main shaft 13 and pull slightly the cable 14 in the parking brake setting direction so that the magnitude of the tension of the cable 14 is determined or adjusted automatically depending upon the biasing force of the tension spring 18 and the position of the cam follower 17 with respect to the second cam portion 12b.

When the brake pedal lever 11 is depressed toward the brake engaged position, the cam follower 17 in the cam slot 11a follows the displacement of the brake pedal lever 11 against the biasing force of the tension spring 18, so that the cam plate 12 is rotated about the main shaft 13 to pull the cable 14 and the parking brake is set.

It should be noted that the cable 14 is not tensioned when it is connected with the cam plate 12 (see FIG. 2) and tension of the cable 14 is automatically adjusted depending upon the pivotal movement of the cam plate 12 with respect to the brake pedal lever 11 by means of the tension spring 18 and the cam follower 17.

To set the parking brake, the brake pedal lever 11 is displaced clockwise (in FIG. 1) about the main shaft 13 from the retracted position to the brake engaged position and the nose 23b of the pawl plate 23 rides along the teeth 21' of the ratchet plate 21. When the brake pedal lever 11 reaches the brake engaged position and operator's foot is released from the brake pedal lever 11, the nose 23b of the pawl plate 23 is engaged with the teeth 21' of the ratchet plate 21. Thus, the brake pedal lever 11 is firmly kept in the brake engaged position.

To release the vehicle parking brake, the rod (not shown) is manually operated to pivot the release lever 24 counterclockwise (in FIG. 1) about the pin 24b and the nose 23b of the pawl plate 23 is automatically disengaged from the teeth 21' of the ratchet plate 21 by assist of the tab 24a so that the brake pedal lever 11 is back to the retracted position by the spring 25 and an air cylinder 22.

Although certain preferred embodiment have been shown and described, it should be understood that many changes and modifications may be made therein without departing from the scope of the appended claims.

What is claimed is:

1. A parking brake mechanism for a vehicle comprising:
   a bracket adapted for connection with a body of the vehicle,
   a foot-operated brake pedal lever rotatably supported on a main shaft secured to the bracket, said brake pedal lever being provided with a cam slot,
   a cam plate pivotally mounted on the main shaft to freely rotate with respect to the brake pedal lever, said cam plate having a first cam portion and a second cam portion,
   a cable having one end connected to the cam plate and an opposite end for connection to a wheel brake assembly to be pulled by foot depression of the brake pedal lever,
   a cam follower engaged in the cam slot formed on the brake pedal lever for displacement along the cam slot, and
   a spring disposed between a stationary member and the cam follower and providing a biasing force to urge the cam follower toward the first and second cam portions in pressure contact therewith,
   the cam plate and the brake pedal lever being displaced together upon engagement of the cam follower with the first cam portion, and the cam plate being displaced about the main shaft with respect to the brake pedal lever by the biasing force of the spring in a direction to pull the cable upon engagement of the cam follower with the second cam portion.

2. A parking brake mechanism according to claim 1, further comprising:
   a ratchet plate on which are provided a plurality of teeth, said ratchet plate being secured to the brake pedal lever,
   a pawl plate rotatably supported on a pin and normally disengaged from the teeth of the ratchet plate, and
   a release lever engaged with a part of the pawl plate for disengagement of the pawl plate from the teeth of the ratchet plate upon manual pulling of the release lever.

3. A parking brake mechanism according to claim 2, wherein the second cam portion is composed of a tapered surface and the first cam portion is composed of a semicircular recess continuously formed along a side edge of the tapered surface.

4. A parking brake mechanism according to claim 2, wherein the ratchet plate is located on a side of the cam plate opposite to the cam portions and the cable is connected with the cam plate at a position between the ratchet plate and the first and second cam portions.

* * * * *